Figure 1:
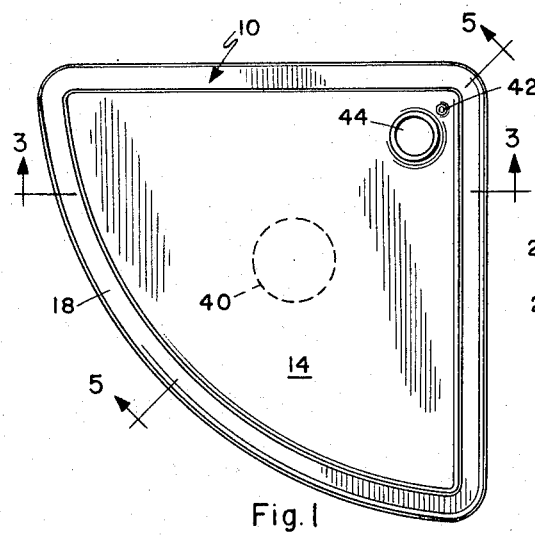

Jan. 9, 1968  V. P. CLINE  3,362,537

AQUARIUM FILTER

Filed Aug. 28, 1964

INVENTOR.
VIRGIL PAUL CLINE
BY
Knox & Knox 3,362,537
AQUARIUM FILTER
Virgil Paul Cline, 1245 Gaywood,
Imperial Beach, Calif. 92032
Filed Aug. 28, 1964, Ser. No. 392,828
1 Claim. (Cl. 210—169)

The present invention relates generally to acquarium filters and more particularly to a submersion type filter which is easy to clean and can be used in a wide range of aquarium sizes.

The primary object of this invention is to provide an improved aquarium filter which is virtually clog-free and needs cleaning only infrequently.

It is a further object of this invention to provide an improved aquarium filter in which the water circulates up through a re-useable foraminous filter, the sediments dropping to the bottom of the filter chamber without contacting, and therefore without fouling the gas filtering means, usually in the form of charcoal pellets, in an upper chamber.

It is a still further object of this invention to provide an improved filter having means to permit free circulation of water therearound.

Finally it is an object to provide an aquarium filter of the aforementioned character which is simple and convenient to use and which will give generally efficient and durable service.

Figure 2:
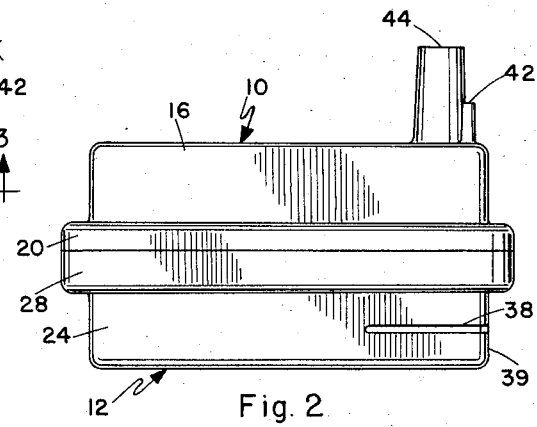
Figure 3:
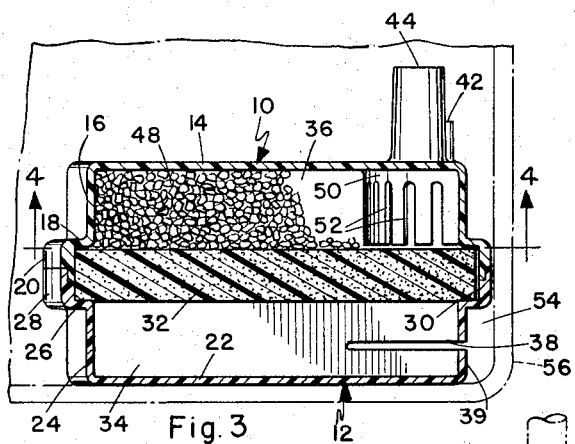
Figure 4:
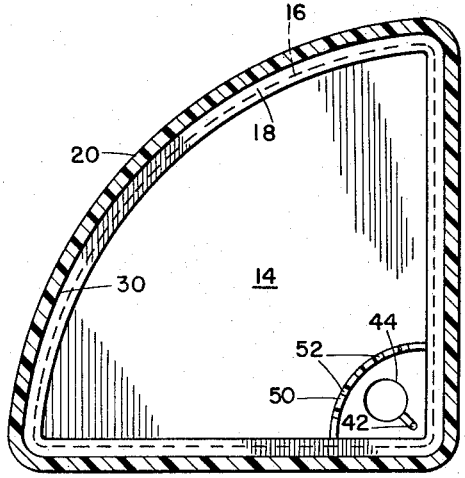
Figure 5:
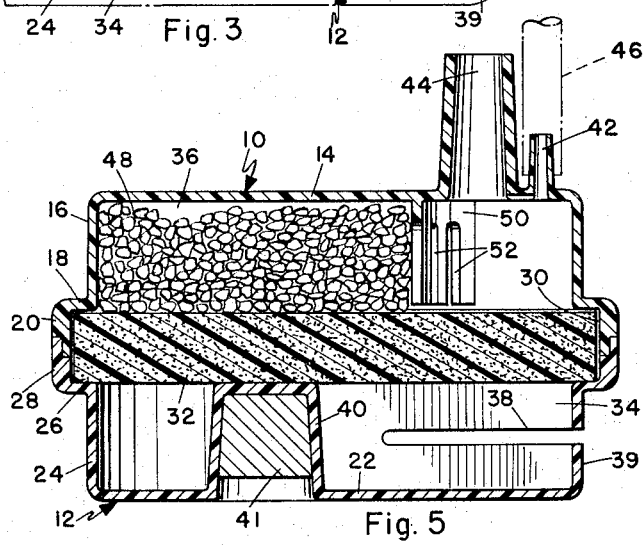

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

FIGURE 1 is a top plan view of the improved filter;
FIGURE 2 is a side elevational view;
FIGURE 3 is a sectional view on the line 3—3 of FIGURE 1;
FIGURE 4 is a sectional view on the line 4—4 of FIGURE 3; and
FIGURE 5 is a sectional view on the line 5—5 of FIGURE 1.

With particular reference to the drawings, the novel and improved filter consists generally of a hollow housing formed of upper and lower halves indicated by the reference numerals 10 and 12, respectively. The upper half 10 includes a horizontally extending top wall 14 bounded by side wall 16 extending normal thereto. The side wall 16 is curved to extend outwardly, as at 18, in a short flange which is generally parallel to the top wall 14. The outer edge of flange 18 is turned downwardly to provide a stepped lip flange structure 20.

The bottom half of the filter housing includes a bottom wall 22, which is generally coextensive with top wall 14, upwardly extending side wall 24, laterally or outwardly extending flange 26 and a stepped lip flange 28. The stepped lip flanges 20 and 28 inter-engage for separable securement together, with a frictional fit, by a conventional telescoping joint structure, as clearly shown in FIGURES 3 and 5. As viewed from the outside, the flanges 20 and 28 present a laterally or outwardly extending rib structure, the purpose of which will be hereinafter described. A channel structure, indicated by the reference numeral 30 etxending completely around the inside of the filter housing, is formed by the flanges 18, 20 and 26, 28.

A foraminous filter pad 32 preferably formed of foamed urethane is peripherally supported in channel 30 and divides the interior of the housing into a lower chamber 34 and an upper chamber 36. Wall 24 of lower chamber 34 is provided with a water inlet slot 38 in the corner 39 and extending along the adjacent sides thereof. If desired, an inward depression 40 may be formed in bottom wall 22 to form a post for supporting filter pad 32 as clearly shown in FIGURE 5. This depression may be filled with lead, concrete or other suitable weighted material 41 to serve as a ballast for the filter housing.

Top wall 14 of chamber 36 is provided with a pair of openings 42 and 44, preferably positioned adjacent each other and in one corner of the housing as shown in FIGURE 1. The opening 42, somewhat smaller than the opening 44, has connected thereto a flexible conduit which leads to a suitable source of compressed air, not shown. A quantity of charcoal pellets 48, which function as a purifying means, is placed in the upper chamber 36. A downwardly extending curved wall 50 provided with slots 52 surrounds the openings 44 and 42 and forms a grid to retain the charcoal pellets 48 in chamber 36 preventing them from being washed up through discharge opening 44.

My improved filter is preferably placed on the bottom of an aquarium below the level of water therein, as shown in FIGURE 3, with the rib formed by the flanges 20 and 28 in contact with the aquarium side walls 56. This provides a channel 54 between the filter and side walls, which restriction or confinement is reflected in increased velocity of the sediment-laden water around the filter and through the slot 38 into the lower chamber 34. This increased velocity results in enhanced capacity of the water as a sediment carrying vehicle, so that the sediment tends to be carried into chamber 34 rather than merely dropped close to the filter as in prior art constructions.

Air under pressure is fed into the filter through the opening 42 and exhausts in the form of bubbles through opening 44 carrying water with it in the manner of a conventional air lift pump. This promotes a circulation of water through the filter, the water entering through slot 38 and passing up through filter pad 32 and charcoal 48 before exhausting through opening 44. It will be evident that any sediment in chamber 34 will settle to the bottom thereof and there will be no clogging of filter pad 32. Periods of use between cleanings are, therefore, greatly extended. Since the charcoal is not in contact with the sediment-laden water, it rarely needs to be cleaned.

It is understood that minor variations from the form of the invention disclosed herein may be made without departure from the spirit and scope of the invention, and that the specification and drawing are to be considered as merely illustrative rather than limiting.

I claim:
1. An aquarium filter comprising:
   a housing formed of upper and lower, separable halves;
   the lower half defining a lower chamber in said housing;
   a foraminous filter pad separating said halves and said chambers;
   pelleted water purifying means in said upper chamber;
   water inlet means in said lower chamber;
   air inlet means in said upper chamber;
   air and water outlet means also located in said upper chamber;
   a wall separating said pelleted water purifying means from said inlet and outlet means in said upper chamber, said wall having openings therein to permit water circulation therethrough;
   laterally extending, interengaging rib flanges on the abutting edges of said halves of said housing intermediate the top and bottom thereof whereby the bottom portion may be spaced from the aquarium walls, said flanges defining an internal channel in the housing and peripherally receiving and holding said foraminous filter pad;

an upwardly extending post means in said lower chamber for supporting said filter pad; and said upwardly extending post being hollow and filled with ballast material.

References Cited

UNITED STATES PATENTS

| | | | |
|---|---|---|---|
| 664,974 | 1/1901 | Searing | 210—460 |
| 1,749,730 | 3/1930 | Kenney | 210—445 X |
| 2,335,756 | 11/1943 | Haldeman | 210—169 X |
| 2,436,077 | 2/1948 | Robertson | 210—445 X |
| 2,533,936 | 12/1950 | Holmes et al. | 210—169 |
| 2,602,548 | 7/1952 | Griffiths | 210—460 X |

FOREIGN PATENTS

| | | |
|---|---|---|
| 1,120,369 | 4/1956 | France. |
| 1,009,854 | 6/1957 | Germany. |

REUBEN FRIEDMAN, *Primary Examiner.*

F. MEDLEY, *Assistant Examiner.*